United States Patent
Kamoshita et al.

(12) 
(10) Patent No.: US 12,304,017 B2
(45) Date of Patent: May 20, 2025

(54) WHEEL ALIGNMENT ADJUSTING DEVICE

(71) Applicant: ANZEN MOTOR CAR CO., LTD., Tokyo (JP)

(72) Inventors: Takashi Kamoshita, Tokyo (JP); Akihiro Nagasaki, Hekinan (JP)

(73) Assignee: ANZEN MOTOR CAR CO., LTD., Tokyo (JP)

( * ) Notice: Subject to any disclaimer, the term of this patent is extended or adjusted under 35 U.S.C. 154(b) by 125 days.

(21) Appl. No.: 17/898,510

(22) Filed: Aug. 30, 2022

(65) Prior Publication Data
US 2024/0066646 A1 Feb. 29, 2024

(51) Int. Cl.
*B23P 19/06* (2006.01)
*B60S 5/00* (2006.01)

(52) U.S. Cl.
CPC ............... *B23P 19/06* (2013.01); *B60S 5/00* (2013.01); *B23P 2700/50* (2013.01)

(58) Field of Classification Search
CPC . B62D 17/00; B60S 5/00; B23P 19/06; B23P 2700/00; G01D 11/275; G01D 11/2755; G01B 5/255
See application file for complete search history.

(56) References Cited

U.S. PATENT DOCUMENTS

| | | | | |
|---|---|---|---|---|
| 4,674,366 A | * | 6/1987 | Lauer | B25B 21/002 81/57.2 |
| 9,199,361 B2 | * | 12/2015 | Taylor | B25B 13/48 |
| 2009/0100972 A1 | * | 4/2009 | Hoenke | B62D 17/00 81/57.36 |
| 2019/0366494 A1 | * | 12/2019 | Shimizu | B23P 19/06 |

FOREIGN PATENT DOCUMENTS

| | | | | |
|---|---|---|---|---|
| JP | H01-104867 U | | 7/1989 | |
| JP | H0481366 A | * | 3/1992 | ............. B62D 17/00 |
| JP | H07232662 A | * | 9/1995 | ............. B62D 17/00 |
| JP | 2000198032 A | | 7/2000 | |
| JP | 2007326171 A | * | 12/2007 | ............. B23P 19/06 |
| JP | 2019209774 A | | 12/2019 | |

OTHER PUBLICATIONS

Office Action dated Apr. 18, 2022 in corresponding Japanese Patent Application No. 2021-091371 with English translation.

* cited by examiner

*Primary Examiner* — Jason L Vaughan (74) *Attorney, Agent, or Firm* — Harness, Dickey & Pierce, P.L.C.

(57) ABSTRACT

Provided is a wheel alignment adjusting device which manages a plurality of kinds of cam bolts with one device. The wheel alignment adjusting device includes a supporting table and a moving part which moves the supporting table; the supporting table has a plurality of adjustment rotating parts which can rotate a cam of a cam bolt and a tightening rotating part which can rotate a locknut of each of the cam bolts; an adjustment arm member having the plurality of adjustment rotating parts is provided in a manner rotatable with a rotational axis as a center; by rotating the adjustment arm member with the rotational axis as the center, one to be used, of the adjustment rotating parts, is made changeable; and a distance between the adjustment arm member and the tightening rotating part is made changeable.

8 Claims, 10 Drawing Sheets

WHEEL ALIGNMENT ADJUSTING DEVICE

CROSS-REFERENCE TO RELATED APPLICATIONS

This application is related to Japanese Patent Application No. 2021-091371 filed on May 31, 2021, the entire contents of which are incorporated by reference herein.

BACKGROUND OF THE INVENTION

Field of the Invention

The present invention relates to a wheel alignment adjusting device.

Description of the Related Art

Figure 9:
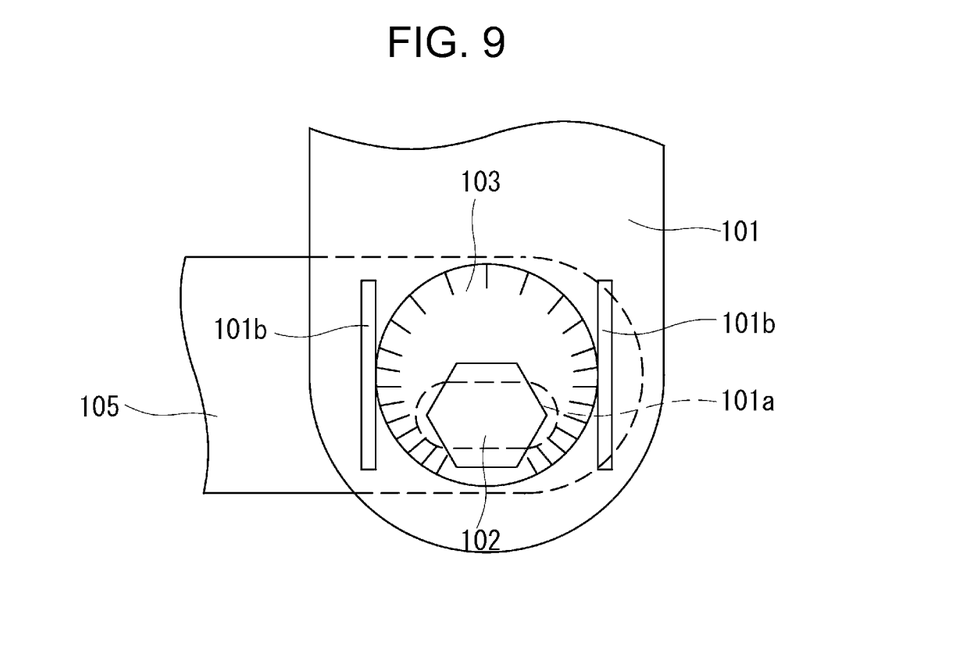
FIG. 9 is a diagram for explaining relationship between a vehicle body and the cam bolt.

Conventionally, as shown in FIG. 9, a cam bolt 102 is inserted into a bracket 101 which is provided for a vehicle body and a cam 103 of the cam bolt 102 is rotated, thereby adjusting wheel alignment.

In a wheel alignment adjusting device described in JP-U-H01-104867, an adjusting part of a cam bolt 102 is rotated by an adjuster, a cam 103 of the cam bolt 102 is thereby rotated about a shaft center of the cam bolt 102 as a center, and after adjusting the wheel alignment, a locknut 104 is tightened by a tightener, a position of the cam 103 is fixed, thereby adjusting the wheel alignment.

The cam bolt used for adjustment of the wheel alignment varies depending on vehicle kinds, and a plurality of kinds of cam bolts are used. For example, as to a cam bolt 102A shown in FIG. 10, an adjusting part 110A and a locknut 104 are provided on both end portions of the cam bolt 102A, and as to a cam bolt 102B shown in FIG. 11, an adjusting part 110B and a locknut 104 are provided on one end portion of the cam bolt 102B.

Figure 10:
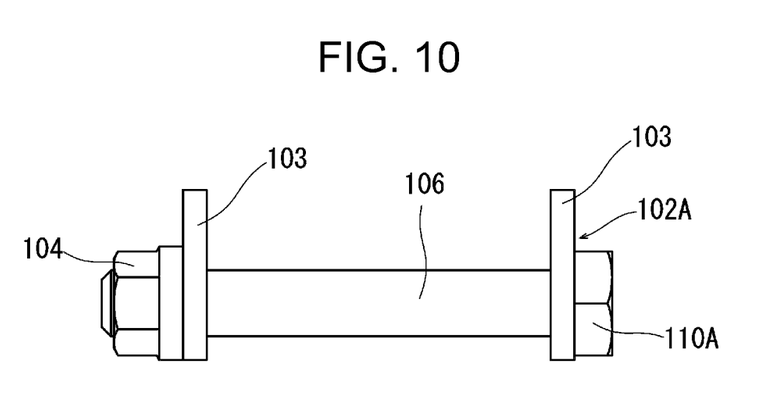
FIG. 10 is a diagram showing one example of the cam bolt.
Figure 11:
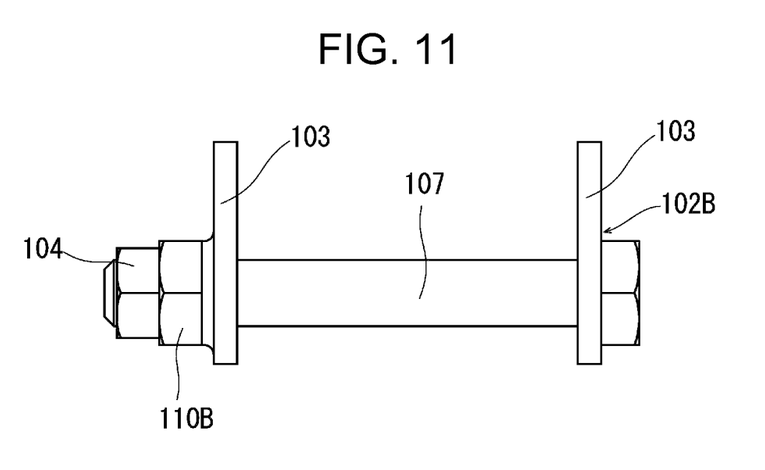
FIG. 11 is a diagram showing another example of the cam bolt.

Although the wheel alignment adjusting device described in JP-U-H01-104867 can manage the cam bolt 102A shown in FIG. 10, the wheel alignment adjusting device described therein cannot manage the cam bolt 102B shown in FIG. 11. On the other hand, although a wheel alignment adjusting device 200 shown in FIG. 12 and FIG. 13 can manage the cam bolt 102B shown in FIG. 11, the wheel alignment adjusting device 200 shown therein cannot manage the cam bolt 102A shown in FIG. 10.

On the other hand, since when vehicles are manufactured, in a state in which a plurality of vehicle kinds are mixedly present on one line or the like, assembly, final adjustment, inspection, and the like are conducted, when the wheel alignment adjusting device can manage only one of the cam bolt 102A and the cam bolt 102B, only vehicle kinds each having the cam bolt which can be managed by the wheel alignment adjusting device can be handled on a line on which that wheel alignment adjusting device is installed, thereby leading to a problem in that efficiency is poor.

Therefore, an object of the present invention is to provide a wheel alignment adjusting device which can manage a plurality of kinds of cam bolts.

BRIEF SUMMARY OF THE INVENTION

In order to solve the above-described problem, the present invention includes: a plurality of adjustment rotating parts, each of which is operable to rotate a cam of a cam bolt; and a tightening rotating part which is operable to rotate a locknut of the cam bolt, wherein by rotating an adjusting part of the cam bolt by one of the adjustment rotating parts, the cam is rotated, an adjustment arm member having at least a first adjustment rotating part and a second adjustment rotating part is provided in a manner rotatable with a rotational axis as a center, and by rotating the adjustment arm member with the rotational axis as the center, one to be used, of the first adjustment rotating part and the second adjustment rotating part, is made changeable, a distance between the adjustment arm member and the tightening rotating part is made changeable, by using the first adjustment rotating part and the tightening rotating part, wheel alignment of a vehicle which has a cam bolt being provided with the adjusting part and the locknut on both end portions of the cam bolt is adjusted, and by using the second adjustment rotating part and the tightening rotating part, wheel alignment of a vehicle which has a cam bolt being provided with the adjusting part and the locknut on one end portion of the cam bolt is adjusted.

In addition, by rotating a tightening side arm member having a plurality of tightening rotating parts with a rotational axis of the tightening side arm member as a center, one to be used, of the tightening rotating parts, may be made replaceable. In addition, the present invention further includes: a supporting table; and a moving part which moves the supporting table, wherein the supporting table may be provided with the adjustment rotating part and the tightening rotating part.

The present invention includes the plurality of adjustment rotating parts which can rotate the cam of the cam bolt and the tightening rotating part which can rotate the locknut of the cam bolt; wherein the adjustment arm member having the plurality of adjustment rotating parts is provided in the manner rotatable with the rotational axis as the center; by rotating the adjustment arm member with the rotational axis as the center, one to be used, of the adjustment rotating parts, is made changeable; and the distance between the adjustment arm member and the tightening rotating part is made changeable, thus allowing one wheel alignment adjusting device to manage the plurality of kinds of cam bolts.

DETAILED DESCRIPTION OF THE INVENTION

Modes for carrying out the present invention will be described on the basis of embodiments shown in the accompanying drawings.

Embodiment 11

Figure 1:
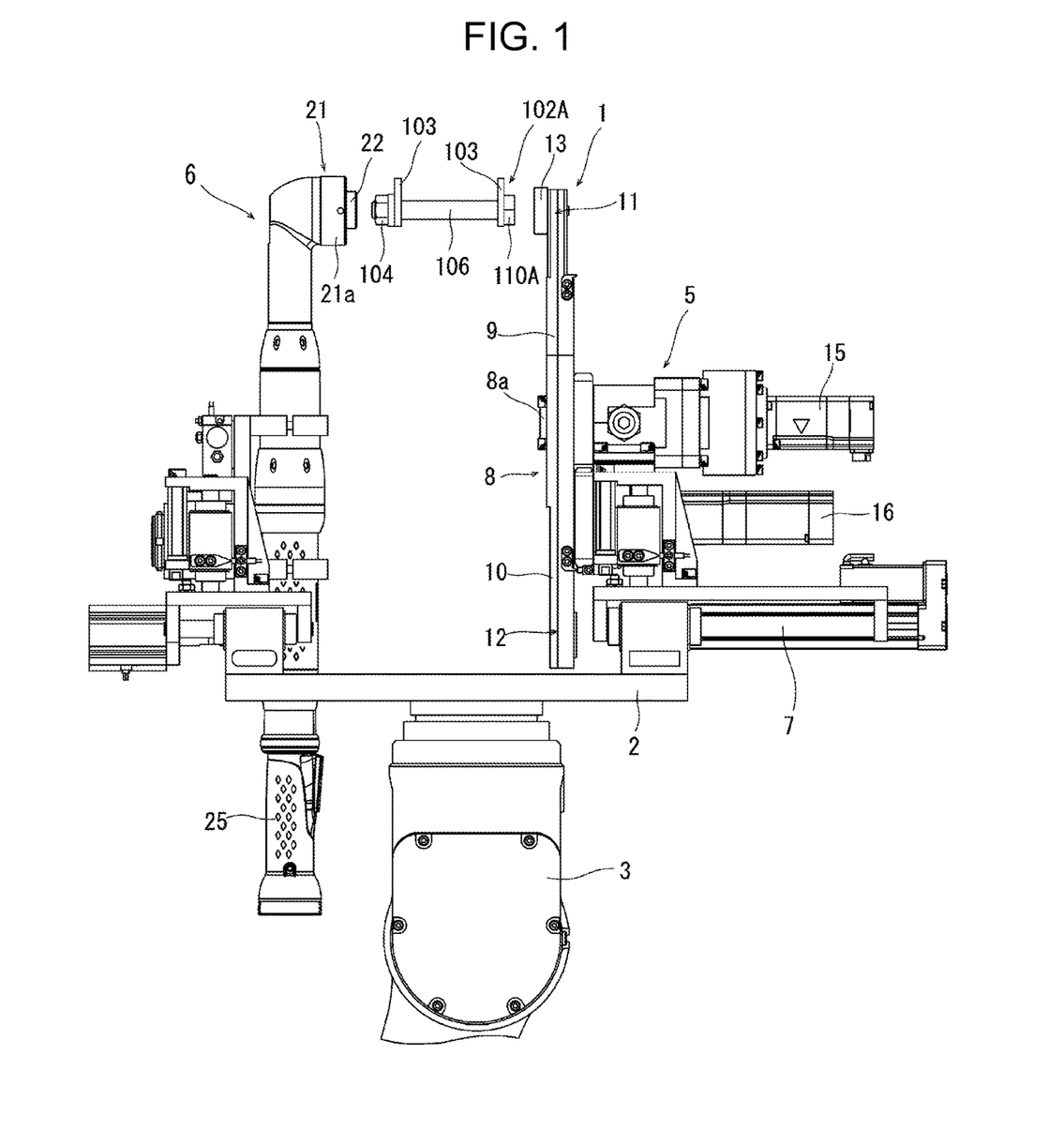
FIG. 1 is a front view of a wheel alignment adjusting device according to an embodiment 1 of the present invention.

FIG. 1 shows a wheel alignment adjusting device 1 in an embodiment 1 of the present invention.

The wheel alignment adjusting device 1 has a supporting table 2. The supporting table 2 includes an adjuster 5 and a tightener 6, can move the supporting table 2 to any position by a first moving part 3 such as a robot arm and can rotate the supporting table 2 with a rotational axis, not shown, as a center to flip invert positions of the adjuster 5 and the tightener 6, for example, horizontally in FIG. 1.

In addition, the adjuster 5 and the tightener 6 each can move in an up-down direction and a right-left direction with respect to the supporting table 2 by moving means, not shown.

Figure 4:
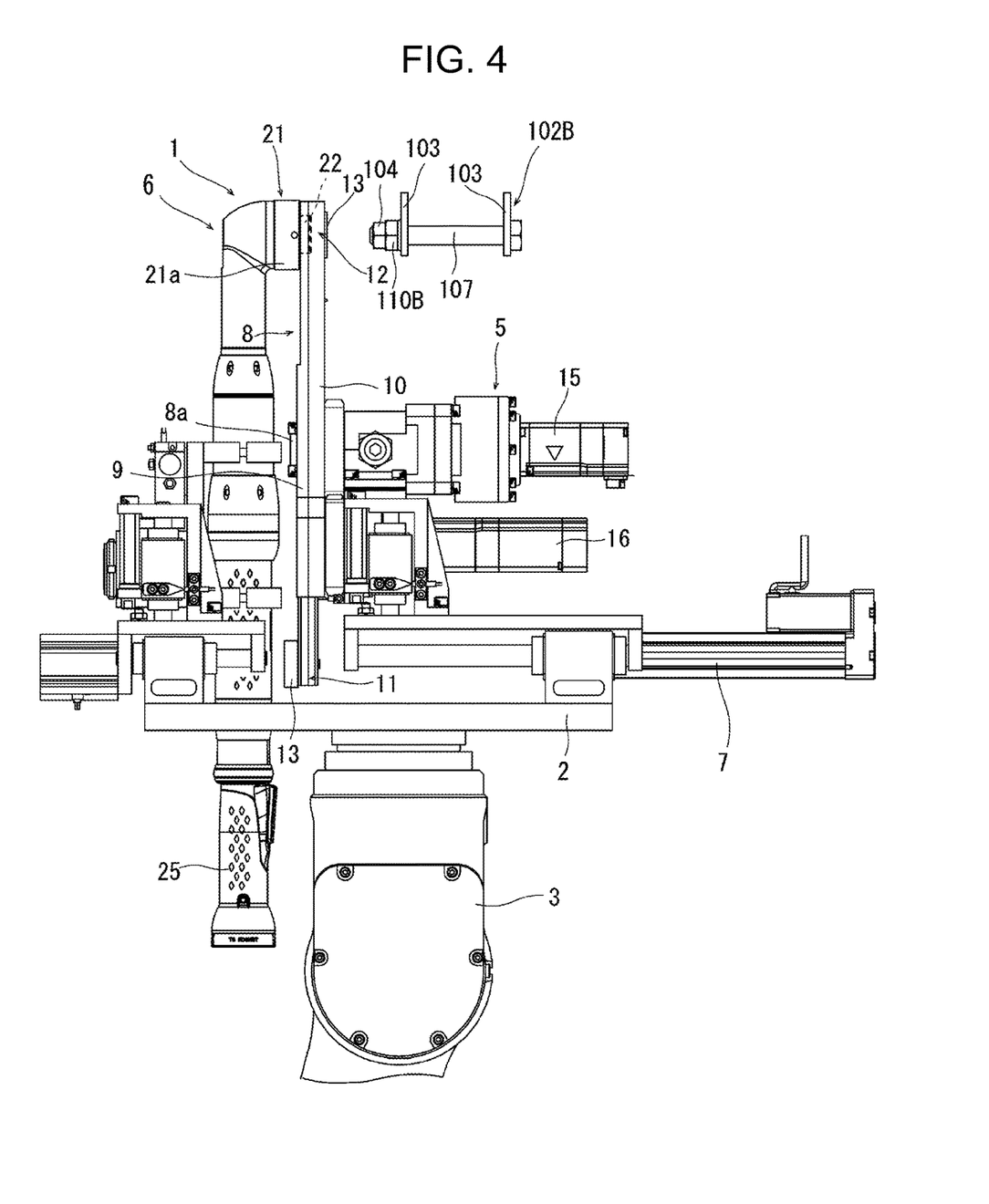
FIG. 4 is a front view in a state in which an adjustment arm member in a state in FIG. 1 is rotated and the tightener and the adjuster are caused to come close to each other.

As shown in FIGS. 1 and 4, the adjuster 5 can move in a right-left direction in FIGS. 1 and 4 by a second moving part 7 such as a cylinder and can change a distance between the later described adjustment arm member 8 and a tightening rotating part 21.

The adjuster 5 has the adjustment arm member 8, and as shown in FIGS. 1 to 5, this adjustment arm member 8 can rotate by a rotating driving part 16 with a rotational axis 8a as a center. The adjustment arm member 8 has a first adjustment attaching arm 9 and a second adjustment attaching arm 10, and a shaft center of the first adjustment attaching arm 9 and a shaft center of the second adjustment attaching arm 10 are formed to be in line with each other.

Figure 3:
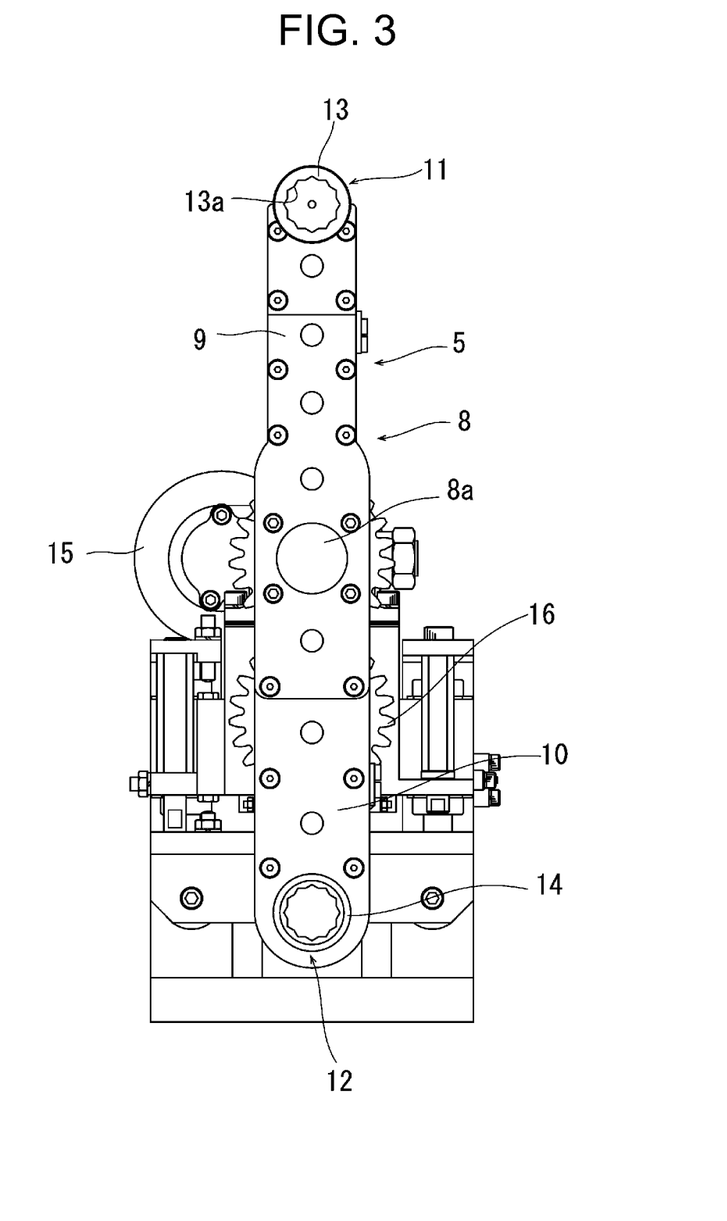
FIG. 3 a diagram of an adjuster used in the embodiment 1 of the present invention, viewed from an inside thereof.
Figure 5:
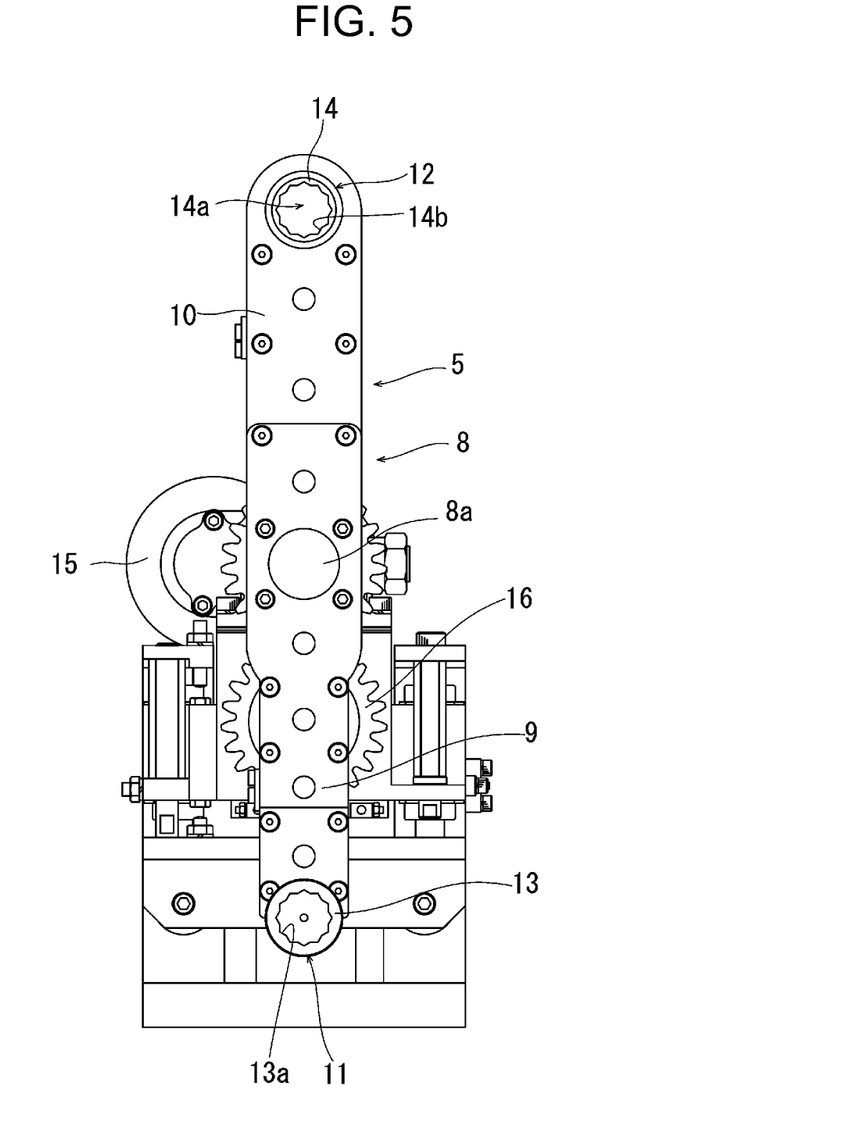
FIG. 5 is a diagram in a state in which the adjustment arm member in a state in FIG. 3 is rotated.

In a leading end portion of the first adjustment attaching arm 9, a first adjustment rotating part 11 is provided. The first adjustment rotating part 11 has an adjustment side socket 13, and the first adjustment side socket 13 can rotate clockwise and counterclockwise with respect to the adjustment attaching arm 9 by an adjustment rotating driving part 15 via a gear train, not shown.

As shown in FIGS. 1, 3, and 5, the first adjustment side socket 13 has a first adjustment side engaging part 13a whose side of the tightener 6 opens. The first adjustment side engaging part 13a can be fitted to an outside surface of a head portion constituting an adjusting part 110A of the cam bolt 102A, and in a state in which the first adjustment side engaging part 13a engages with the adjusting part 110A of the cam bolt 102A, by rotating the first adjustment side socket 13 by the adjustment rotating driving part 15, the cam 103 of the cam bolt 102A can be rotated clockwise and counterclockwise in a predetermined amount with a shaft center of the cam bolt 102 as a center.

In a leading end portion of the second adjustment attaching arm 10, as shown in FIGS. 1 and 3, a second adjustment rotating part 12 is provided. The second adjustment rotating part 12 has a second adjustment side socket 14, the second adjustment side socket 14 can rotate a gear provided on an outer peripheral surface of the second adjustment side socket 14 clockwise and counterclockwise with respect to the second adjustment attaching arm 10 by the adjustment rotating driving part 15 via a gear train, not shown, and the second adjustment side socket 14 can be rotated clockwise and counterclockwise with respect to the second adjustment attaching arm by the adjustment rotating driving part 15.

As shown in FIG. 5, in the second adjustment side socket 14, a through hole 14a which penetrates in a direction in parallel with the rotational axis 8a of the adjustment arm member 8 is formed. On a side opposite to the side of the tightener 6 on an inner surface of the through hole 14a, as shown in FIG. 6, a second adjustment side engaging part 14b which can be fitted to an outside surface of a nut, which constitutes the adjusting part 110B of the cam bolt 102B, is formed.

Figure 8:
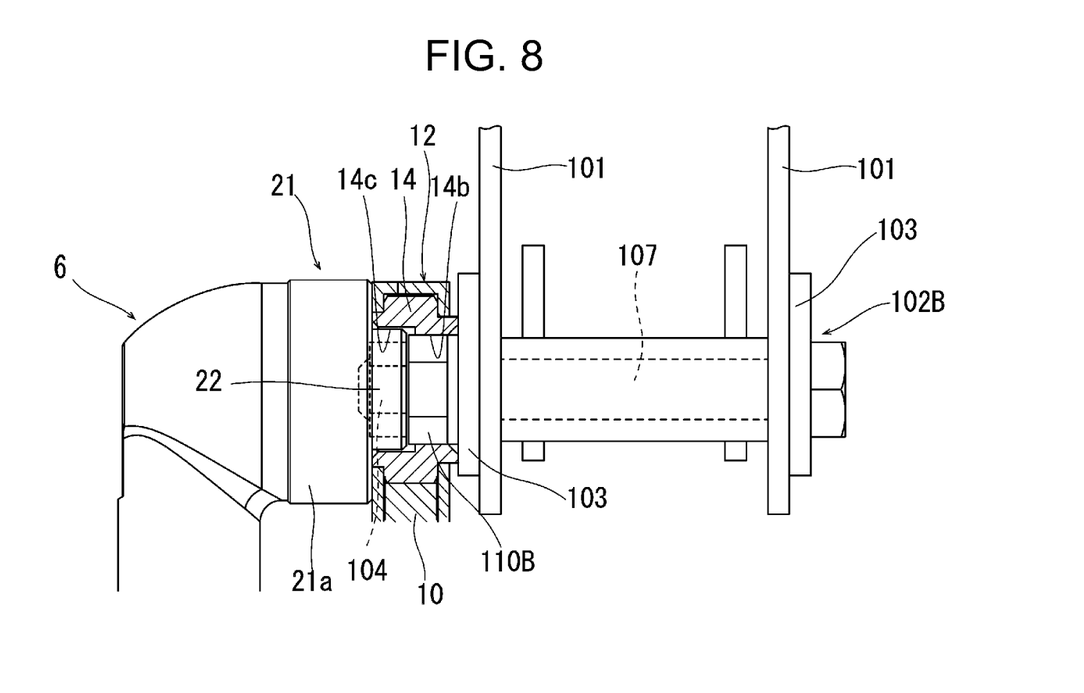
FIG. 8 is a partial sectional view in a state in which the cam bolt is attached from a state in FIG. 7.

As shown in FIG. 8, in a state in which the second adjustment side engaging part 14b is engaged with the adjusting part 110B of the cam bolt 102B, by rotating the second adjustment side socket 14 by the adjustment rotating driving part 15, the cam 103 of the cam bolt 102B can be rotated clockwise and counterclockwise in a predetermined amount with a shaft center of the cam bolt 102B as a center.

Figure 6:
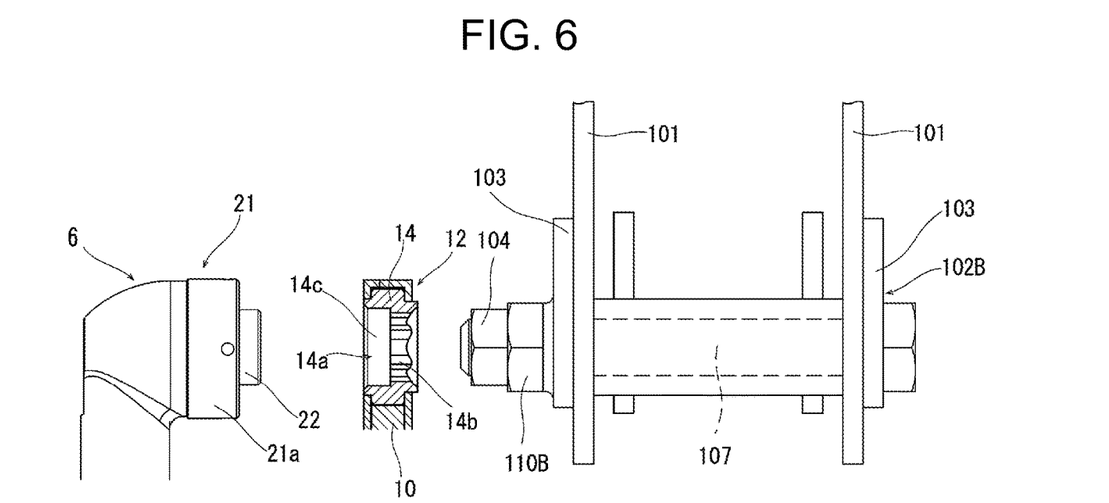
FIG. 6 is a partial sectional view showing relationship of a second adjustment rotating part of the adjuster used in the embodiment 1 of the present invention, a tightening rotating part, and a cam bolt.

On a side of the tightener 6 on an inner surface of the through hole 14a, as shown in FIG. 6, a cylindrical loose fitting part 14c is formed. An inner diameter of the loose fitting part 14c is set to be larger than an outer diameter of the later described tightening side socket 22.

As shown in FIGS. 1 and 2 and FIGS. 4 to 8, the tightener 6 has the tightening rotating part 21, and the tightening rotating part 21 has the tightening side socket 22 whose at least one part protrudes to a side of the adjuster 5 further than a main body part 21a of the tightening rotating part 21. This tightening side socket 22 can rotate clockwise and counterclockwise with respect to the main body part 21a by a tightening rotating driving part 25 via a gear train, not shown.

The tightening side socket 22 has a tightening side engaging part 22a whose side of the adjuster 5 opens, the tightening side engaging part 22a can be fitted to outside surfaces of the locknuts 104 of the cam bolts 102A and 102B, the tightening side socket 22 is rotated by the tightening rotating driving part 25 in a state in which the tightening side engaging part 22a is engaged with the locknuts 104 of the cam bolt 102A and 102B, the locknuts 104 of the cam bolts 102A and 102B are thereby rotated with shaft centers of the cam bolts 102A and 102B as centers, thereby allowing the locknuts 104 to be tightened by a predetermined tightening force (torque).

Next, a method for adjusting wheel alignment in which the cam bolt 102A is used will be described.

As shown in FIG. 9, between a pair of brackets 101 and 101 on a side of a suspension member attached to a vehicle body, not shown, an arm 105 whose end portion is connected to a wheel is disposed.

As shown in FIG. 9, in each of the brackets 101, a long hole-shaped insertion hole 101a is formed, and the cam bolt 102A is inserted into the insertion hole 101a such that both ends of the cam bolt 102A protrude outside from the insertion hole 101a.

In both end portions of the cam bolt 102A in an axial direction, a pair of cams 103 and 103 are included, and on an outer side of each of the brackets 101, each of the cams 103 is located. One of the cams 103 is fixed to a shaft part 106 of the cam bolt 102A, and on an outer side of the one of the cams 103, the adjusting part 110A whose outer peripheral surface is constituted of a hexagonal shaped head portion is fixed to the shaft part 106.

The other of the cams 103 can move in a shaft center direction of the shaft part 106 without rotating in a circumferential direction with respect to the shaft part 106. A shape of the one of the cams 103 and a shape of the other of the cams 103 with respect to the shaft part 106 are formed to be substantially the same as each other. When the adjusting part 110A is rotated, the whole cam bolt 102A rotates with a shaft center of the shaft part 106 as a center, and the both cams 103 and 103 can be rotated with the shaft center of the shaft part 106 as the center.

In addition, as shown in FIG. 9, each of the cams 103 is disposed between a pair of cam receiving parts 101b and 101b provided for the bracket 101.

In at least a leading end portion of the shaft part 106, a male screw is engraved, and the locknut 104 is screwed with this male screw.

The adjusting part 110A is rotated clockwise or counterclockwise, the cams 103 are rotated, the cam bolt 102A thereby moves inside the insertion hole 101a, a position of the arm 105 with respect to the bracket 101 thereby changes, thereby allowing the wheel alignment (a toe angle, a camber angle, a caster angle, and the like) to be changed and adjusted.

Next, a method for adjusting wheel alignment of a vehicle body having the cam bolt 102A, in which the wheel alignment adjusting device 1 is used, will be described.

First, as shown in FIG. 1, the adjustment arm member 8 is rotated with the rotational axis 8a as the center by the rotating driving part 16 so as to locate the first adjustment rotating part 11 in a predetermined position (in an upper portion in FIG. 1). In addition, the adjuster 5 is moved by the second moving part 7, and a distance between the first adjustment side socket 13 of the adjuster 5 and the tightening side socket 22 of the tightener 6 is made larger than a length of an axial direction of the cam bolt 102A.

Next, the adjuster 5 is moved to be located outside the adjusting part 110A and the tightener 6 is moved to be located outside the locknut 104 by the first moving part 3.

Next, the adjuster 5 is moved to a side of the tightener 6 by the second moving part 7, and the adjusting part 110A of the cam bolt 102A is fitted to the first adjustment side engaging part 13a of the first adjustment side socket 13 of the adjuster 5. In addition, the locknut 104 is fitted to the tightening side engaging part 22a of the tightening side socket 22 of the tightener 6.

Next, the first adjustment side socket 13 is rotated by the adjustment rotating driving part 15 and the cams 103 of the cam bolt 102A are rotated, and on the basis of sensors, not shown, or the like, the change and the adjustment are made so as to attain predetermined numerical values of the wheel alignment (the toe angle, the camber angle, the caster angle, and the like).

Next, the tightening side socket 22 is rotated by the tightening rotating driving part 25, the locknut 104 is tightened so as to attain a predetermined tightening force, and positions of the cams 103 are fixed.

Next, the wheel alignment adjusting device 1 is detached from the cam bolt 102A by the first moving part 3 and the second moving part 7 and is retracted from the vehicle body, and the adjustment of the wheel alignment is finished.

Next, a method for adjusting the wheel alignment, in which the cam bolt 102B is used, will be described.

As shown in FIGS. 6 and 11, the cam bolt 102B includes a pair of cams 103 and 103, and each of the cams 103 is located outside each of the brackets 101. One of the cams 103 is fixed to a shaft part 107 of the cam bolt 102B.

The other of the cams 103 can move in a shaft center direction of the shaft part 107 without rotating in a circumferential direction with respect to the shaft part 107. Outside the other of the cams 103, the adjusting part 110B whose outer peripheral surface is constituted of a hexagonal shaped head portion is formed integrally with the other of the cams 103. When the adjusting part 110B is rotated, the whole cam bolt 102B is rotated with a shaft center as a center, and the both cams 103 and 103 can be rotated with a shaft center of the shaft part 107 as a center.

In at least a leading end portion of the shaft part 107, a male screw is engraved, and the locknut 104 is screwed with this male screw.

Since a structure of the cam bolt 102B other than the above-described respects is similar to that of the cam bolt 102A, description therefor is omitted.

Next, a method for adjusting of wheel alignment of a vehicle body having the cam bolt 102B, in which the wheel alignment adjusting device 1 is used, will be described.

Figure 2:
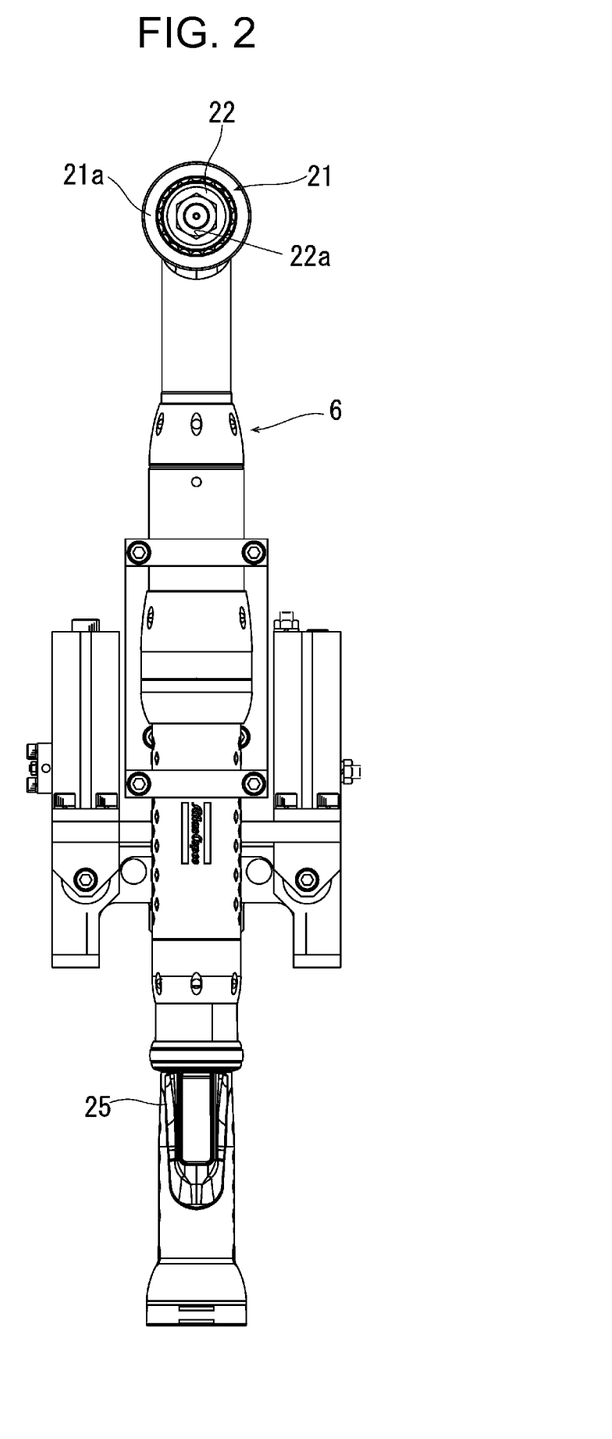
FIG. 2 is a diagram of a tightener used in the embodiment 1 of the present invention, viewed from an inside thereof.
Figure 7:
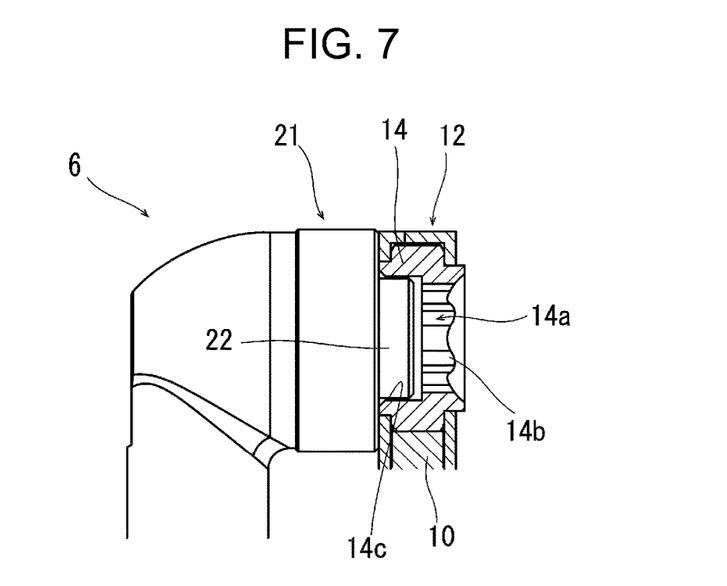
FIG. 7 is a partial sectional view in a state in which a tightening side socket of the tightening rotating part is inserted into a loose fitting part of a second adjustment side socket of the second adjustment rotating part from a state in FIG. 6.

First, the adjustment arm member 8, for example, in a state shown in FIGS. 1 and 2 is rotated with the rotational axis 8a as the center, and the adjustment rotating part to be used is changed from the first adjustment rotating part 11 to the second adjustment rotating part 12 such that as shown in FIG. 4, the second adjustment rotating part 12 is located in a predetermined position (in an upper portion in FIG. 1), thereby setting the second adjustment rotating part 12 as the adjustment rotating part to be used. In addition, the adjuster 5 is moved to the side of the tightener 6 by the second moving part 7, and as shown in FIG. 7, at least one part of the tightening side socket 22 of the tightening rotating part 21 or in the present embodiment, the whole tightening side socket 22 which protrudes to the side of the adjuster 5 further than the main body part 21a is inserted into the loose fitting part 14c of the second adjustment side socket 14 of the second adjustment rotating part 12 of the adjuster 5.

Next, as shown in FIG. 8, from a side of the locknut 104 of the cam bolt 102B, the cam bolt 102B is inserted into the through hole 14a of the second adjustment side socket 14 by the first moving part 3 or the like from a side of the second adjustment side engaging part 14b.

Thus, as shown in FIG. 8, the locknut 104 is fitted to the tightening side engaging part 22a of the tightening side socket 22 of the tightener 6, and the adjusting part 110B of the cam bolt 102B is fitted to the second adjustment side engaging part 14b of the second adjustment side socket 14 of the adjuster 5.

Next, the second adjustment side socket 14 is rotated by the adjustment rotating driving part 15 and the cams 103 of the cam bolt 102B are rotated, and on the basis of sensors, not shown, or the like, change and adjustment are made so as to attain predetermined numerical values of the wheel alignment (the toe angle, the camber angle, the caster angle, and the like).

Next, the tightening side socket 22 is rotated by the tightening rotating driving part 25 and the locknut 104 is tightened so as to attain a predetermined tightening force, and positions of the cams 103 are fixed. Since the tightening side socket 22 of the tightening rotating part 21 is inserted into the loose fitting part 14c of the second adjustment side socket 14 in a loosely fitted manner, tightening of the locknut 104 can be made without interfering with the second adjustment rotating part 12.

Next, the wheel alignment adjusting device 1 is detached from the cam bolt 102B by the first moving part 3 or the like and is retracted from the vehicle body, thereby finishing the adjustment of the wheel alignment.

By the above-described structure, the wheel alignment adjusting device 1 can adjust the wheel alignment of the vehicle body having both of the cam bolt 102A and the cam bolt 102B with one device and can efficiently conduct assembly, final adjustment, inspection, and the like of the vehicle body, as compared with the conventional device.

In addition, since by rotating the adjustment arm member 8 with the rotational axis 8a as the center, replacement between the first adjustment rotating part 11 and the second adjustment rotating part 12 to be used can be made and only by moving the adjuster 5 by the second moving part 7, switching between the cam bolt 102A and the cam bolt 102B can be made, change can be made in a short time, the structure thereof is simple, and manufacturing costs can be thereby suppressed low.

Since the tightening side socket 22 of the tightening rotating part 21 is inserted into the loose fitting part 14c of the second adjustment side socket 14 in the loosely fitted manner, a gear thickness of the gear train which rotates the tightening rotating part 21 can be sufficiently ensured, a strength of the gear can be ensured, a space of the second adjustment side socket 14 and the tightening rotating part 21 can be made compact, and upon adjusting the wheel alignment, interference with auxiliaries and the like of the vehicle body can be suppressed.

Figure 12:
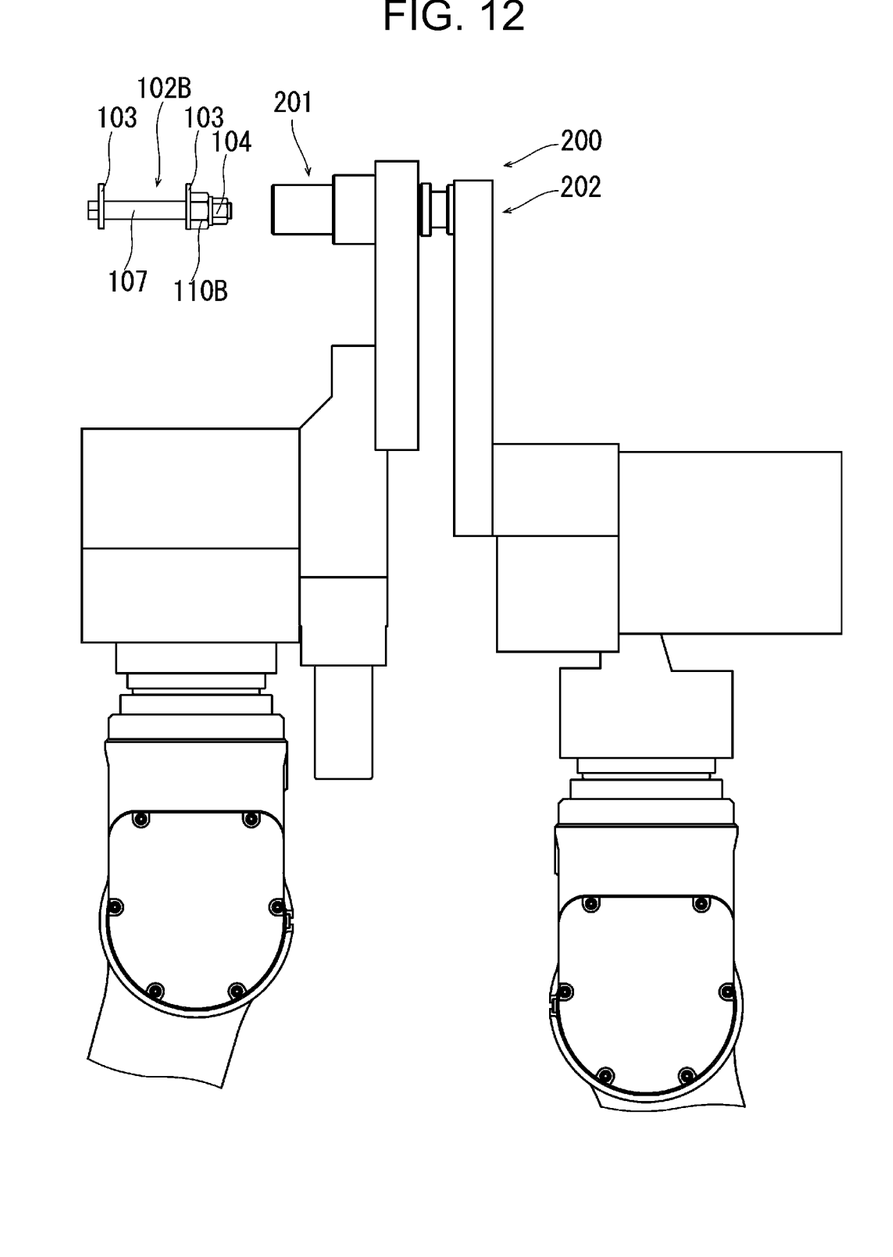
FIG. 12 is a schematic view of a wheel alignment adjusting device according to the conventional technology.
Figure 13:
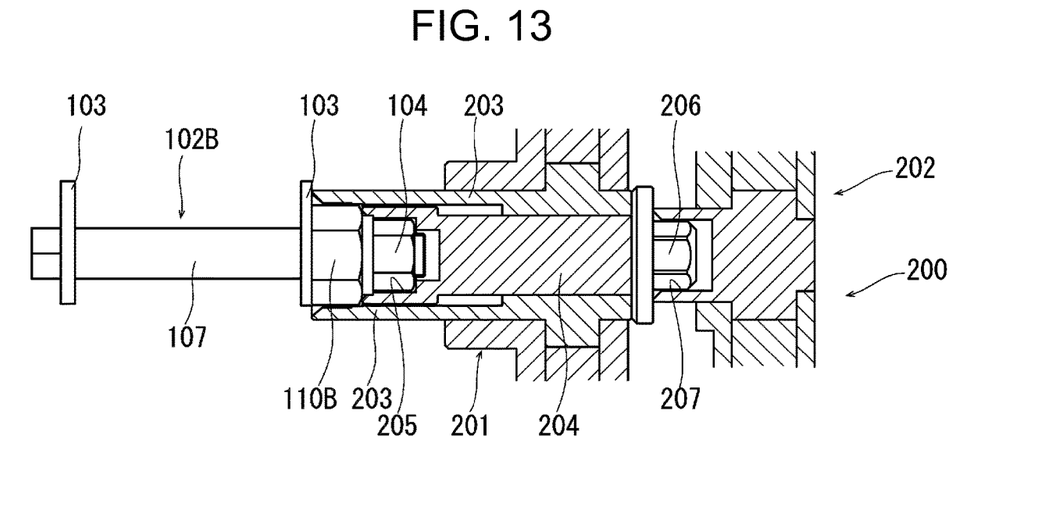
FIG. 13 is a longitudinal sectional view of a chief part in FIG. 12.

In addition, the conventional wheel alignment adjusting device 200 shown in FIGS. 12 and 13 has an adjuster 201 which rotates an adjusting part 110B, thereby rotates cams 103, and adjusts wheel alignment and a tightener 202 which tightens a locknut 104 and thereby fixes positions of the cams 103. As shown in FIG. 13, the adjuster 201 has a cylindrical adjustment engaging part 203 which engages with an outer surface of the adjusting part 110B. The adjustment engaging part 203 can rotate clockwise and counterclockwise by a gear which is located thereoutside.

The tightener 202 has a rod-shaped connecting member 204, which can rotate with a shaft center of the adjustment engaging part 203 as a center, inside the cylindrical adjustment engaging part 203, the connecting member 204 is provided with a first engaging part 205 which engages with a locknut 104, and the other of end portions thereof has a second engaging part 207 which engages with a tightening socket 206. By rotating the tightening socket 206, the locknut 104 can be tightened.

As described above, in the above-described conventional wheel alignment adjusting device 200, the connecting member 204 is provided inside the cylindrical adjustment engaging part 203, the first engaging part 205 which engages with the locknut 104 is formed in one end portion of the connecting member 204, and the second engaging part 207 which engages with the tightening socket 206 is formed in the other end portion thereof, whereby a structure of the adjusting part 110B provided in one end portion of the cam bolt 102B and a structure of a part which rotates the locknut 104 are complex and an occupied volume is increased, thus leading to a problem in that in a case where a space for inserting this part of the device into a vehicle body is not available, the conventional wheel alignment adjusting device 200 cannot be used.

In contrast thereto, since in the invention of the present application, the tightening side socket 22 of the tightening rotating part 21 is inserted into the loose fitting part 14c of the second adjustment side socket 14 in the loosely fitted manner, a structure of the adjusting part 110B provided in one end portion of the cam bolt 102B and a structure of a part which rotates the locknut 104 can be formed to be compact with a number of parts reduced, as compared with the wheel alignment adjusting device 200. Thus, an occupied volume of this part is decreased, and also in a case where a space for inserting this part of the device into a vehicle body is smaller than that of the wheel alignment adjusting device 200, the wheel alignment adjusting device 1 can be used, and by using the wheel alignment adjusting device 1 for a further wide variety of vehicles, wheel alignment can be adjusted.

Embodiment 2

Although in the above-described embodiment 1, the adjuster 5 has the adjustment arm member 8 which has two adjustment attaching arms, which are the first adjustment attaching arm 9 and the second adjustment attaching arm 10, and each of the adjustment attaching arms 9 (10) is provided with each of the adjustment rotating parts 11 (12), respectively, the adjustment arm member may be provided with three or more adjustment attaching arms, and each of the adjustment attaching arms may be provided with one adjustment rotating part, respectively.

An adjustment rotating part is formed to be operable to engage with and rotate an adjusting part of a cam bolt attached to a vehicle body.

Since a structure other than the above-described respects is similar to that of the embodiment 1, description therefor is omitted.

Also in the embodiment 2, effects similar to those in the embodiment 1 are exhibited.

Embodiment 3

Although in each of the above-described embodiments 1 and 2, the tightener 6 has only one tightening rotating part 21, as with the adjustment arm member of the adjuster 5 in each of the above-described embodiments 1 and 2, the tightening arm member may be provided with a plurality of tightening attaching arms, each of the tightening attaching arms may be provided with one tightening rotating part, respectively and rotating the tightening arm member with a rotational axis as a center may allow change of the tightening rotating part to be used.

It is to be noted that the adjustment arm member of the adjuster 5 may be provided with a plurality of adjustment rotating parts or only one adjustment rotating part in accordance with a shape of the cam bolt to be adjusted.

Each of the tightening rotating parts is formed to be operable to rotate locknuts having different shapes.

Since a structure other than the above-described respects is similar to that of each of the embodiments 1 and 2, description therefor is omitted.

Also in the embodiment 3, effects similar to those in each of the embodiments 1 and 2 are exhibited.

The invention claimed is:
1. A wheel alignment adjusting device comprising:
a plurality of adjustment rotating parts including a first adjustment rotating part and a second adjustment rotating part, each of the plurality of adjustment rotating parts is operable to rotate a cam of a cam bolt; and a tightening rotating part being operable to rotate a locknut of the cam bolt, wherein
by rotating an adjusting part of the cam bolt by one of the adjustment rotating parts, the cam is rotated, an adjustment arm member having at least the first adjustment rotating part and the second adjustment rotating part is provided in a manner rotatable with a rotational axis as a center, and by rotating the adjustment arm member with the rotational axis as the center, the first adjustment rotating part and the second adjustment rotating part are positionally changeable, by using the first adjustment rotating part and the tightening rotating part, wheel alignment of a vehicle having the cam bolt being provided with the adjusting part on an end portion of the cam bolt and the locknut on an other end portion of the cam bolt is adjusted, and by using the second adjustment rotating part and the tightening rotating part, wheel alignment of the vehicle having the cam bolt being provided with the adjusting part and the locknut on the other end portion of the cam bolt is adjusted.

2. The wheel alignment adjusting device according to claim 1, wherein by rotating the adjustment arm member with a rotational axis of the adjustment arm member as a center, the tightening rotating part includes a plurality of tightening rotating parts which are positionally replaceable.

3. The wheel alignment adjusting device according to claim 1, further comprising:
   a supporting table; and a moving part moving the supporting table, wherein
   the supporting table is provided with the plurality of adjustment rotating parts and the tightening rotating part.

4. The wheel alignment adjusting device according to claim 2, further comprising:
   a supporting table; and a moving part moving the supporting table, wherein
   the supporting table is provided with the plurality of adjustment rotating parts and the tightening rotating part.

5. The wheel alignment adjusting device according to claim 3, wherein
   the supporting table includes an adjuster and a tightener each of which movable in an up-down direction and a right-left direction with respect to the supporting table.

6. The wheel alignment adjusting device according to claim 4, wherein
   the supporting table includes an adjuster and a tightener each of which movable in an up-down direction and a right-left direction with respect to the supporting table.

7. The wheel alignment adjusting device according to claim 1, wherein
   the second adjustment rotating part includes a fitting part, wherein at least a portion of the tightening rotating part is inserted into the fitting part.

8. The wheel alignment adjusting device according to claim 1, wherein
   the first adjustment rotating part is separated from the tightening rotating part in an axial direction of the cam bolt, and
   the second adjustment rotating part abuts the tightening rotating part in the axial direction of the cam bolt.

* * * * *